United States Patent
Northrop et al.

(10) Patent No.: US 6,622,657 B2
(45) Date of Patent: *Sep. 23, 2003

(54) CONTINUOUS FLOW WATERING DEVICE FOR PETS

(75) Inventors: Melaney Northrop, Cleburne, TX (US); Scott A. Skurdalsvold, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/226,266

(22) Filed: Aug. 23, 2002

(65) Prior Publication Data

US 2002/0189548 A1 Dec. 19, 2002

Related U.S. Application Data

(63) Continuation-in-part of application No. 09/874,491, filed on Jun. 5, 2001.

(51) Int. Cl.⁷ .................................................. A01K 7/02
(52) U.S. Cl. ............................ 119/74; 119/72; 119/702
(58) Field of Search .............................. 119/74, 72, 702

(56) References Cited

U.S. PATENT DOCUMENTS

| | | | |
|---|---|---|---|
| 3,720,184 A | 3/1973 | Pearce | 119/51.5 |
| 3,901,439 A | 8/1975 | Willis | 239/12 |
| 4,721,063 A | 1/1988 | Atchley | 119/52 |
| 4,747,538 A | 5/1988 | Dunn et al. | 239/20 |
| 4,836,142 A | 6/1989 | Duback | 119/5 |
| 4,976,220 A | 12/1990 | Gershman | 119/18 |
| 5,167,368 A | 12/1992 | Nash | 239/17 |
| 5,259,336 A | 11/1993 | Clark | 119/51.5 |
| 5,326,032 A | 7/1994 | Quillin | 239/20 |
| 5,501,178 A | 3/1996 | Kemp | 119/74 |
| 5,743,210 A | 4/1998 | Lampe | 119/51.5 |
| 5,799,609 A | 9/1998 | Burns et al. | 119/74 |
| 5,842,437 A | 12/1998 | Burns | 119/74 |
| 5,845,600 A | 12/1998 | Mendes | 119/51.5 |
| 6,055,934 A | 5/2000 | Burns et al. | 119/74 |
| 6,079,361 A | 6/2000 | Bowell et al. | 119/72 |
| 6,101,974 A | 8/2000 | Frohlich | 119/51.5 |
| D432,279 S | 10/2000 | Kim | D30/121 |
| 6,142,099 A | 11/2000 | Lange, Jr. | 119/51.5 |

*Primary Examiner*—Charles T. Jordan
*Assistant Examiner*—Bret Hayes
(74) *Attorney, Agent, or Firm*—Locke Liddell & Sapp LLP

(57) ABSTRACT

A continuous watering device for small pets producing minimal noise and splashing, the watering device having a lower container for holding water and a submersible pump to pump water via a diverter tube into an upper reservoir. Water is filtered inside and flows from the upper reservoir onto a smooth and curved ramp, which supports the water as the water slides downward and into the lower container. The diverter contains a lower portion and an upper portion where lower portion connects to the pump and the upper portion directs the water inside the upper reservoir. The upper portion is angularly displaced from the diverter lower portion to direct water inside the upper reservoir bottom area to reduce turbulence and noise and to efficiently direct water through the filter.

12 Claims, 5 Drawing Sheets

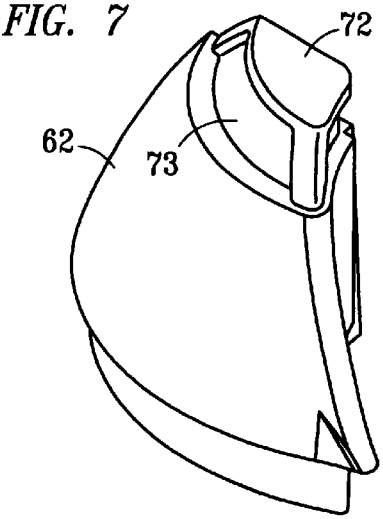
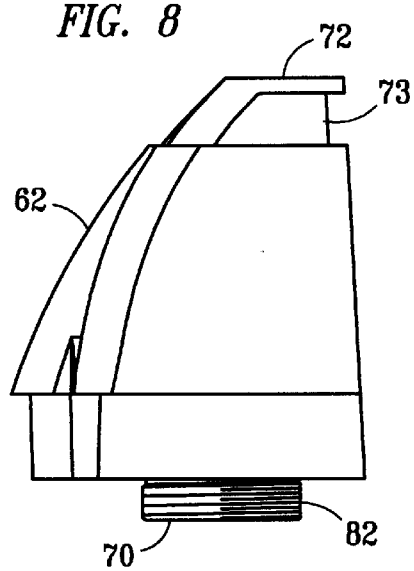
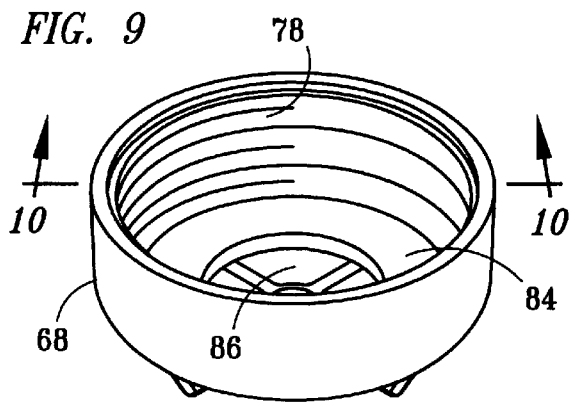
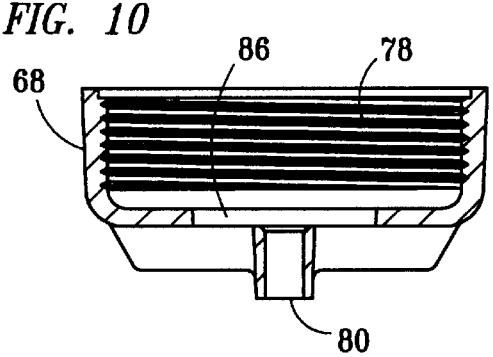
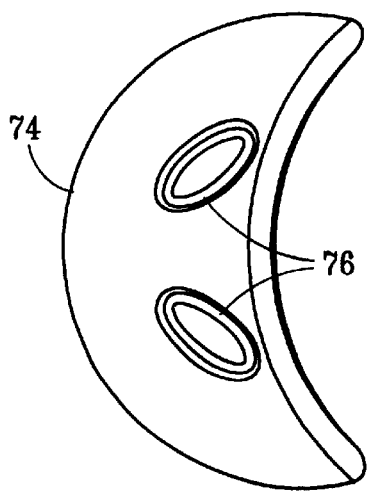

CONTINUOUS FLOW WATERING DEVICE FOR PETS

CROSS REFERENCE TO RELATED APPLICATION

This application is a continuation of U.S. application Ser. No. 09/874,491 filed on Jun. 5, 2001 and claims in-part benefit therefrom.

BACKGROUND OF THE INVENTION

1. Field of the Invention

This invention relates to pet watering devices, more particularly to a continuous waterer device for pets whereby water is circulated to provide continuous running water for animals.

2. Description of Related Art

Animal watering devices that create flowing water to attract small pets is well known in the art; however, these devices create unwanted noises and splashing, a nuisance to pet owners. These unwanted noises often frighten pets which make them reluctant to approach such devices.

In addition, prior art watering devices do not provide an automatic, simple and spill free method to replenish the water supply lost from evaporation or use. Re-filling these watering devices are performed by carrying the device to a water source, or by emptying water into the device from a second receptacle, such as a cup or jar. This creates an inconvenience for pet owners and requires frequent monitoring of the water level because there is no means to automatically re-fill the device to maintain a minimum water level. While some devices disclose a secondary reservoir to continuously replenish the water supply, spilling will inevitably occur when replacing the secondary reservoirs because the bottles must be inverted in order to be attached to the waterer device.

SUMMARY OF THE INVENTION

The continuous waterer device disclosed herein has a unique structure that causes the operation of the device to produce minimal noise and minimal splashing. The waterer preferably comprises a lower container to hold water so that the pet may drink therefrom. A submersible pump is located in the lower container to circulate water from the lower container to an upper reservoir where the water can be filtered. The pump is positioned in the lower container so that the suction ports are fully submerged in order to reduce the noise associated with the operation of the pump. The filter removes debris such as cat hair, dirt, etc. that may collect in the water. The water exits the upper reservoir onto a ledge that directs the flow of water onto a continuous and curved ramp. The ledge is shaped to produce silent and laminar flow down the center of the continuous ramp until the water reaches the lower container.

Water is transported from the submersible pump to the upper reservoir via a diverter tube. The diverter contains a lower portion, which attaches to the pump, and an upper portion, which directs water from the diverter inside the bottom of the upper reservoir so that water enters the upper reservoir below the water storage level that is maintained in the upper reservoir during operation. This configuration substantially reduces the amount of turbulence and noise that occurs during operation as the height of the water inside the upper reservoir acts as an insulator. The upper portion is angularly displaced from the lower portion such that the water flow will be directed toward the filter to more efficiently clean the water.

This apparatus provides numerous advantages for both the pets and their owners. The continuous flow of water provides a sanitary drinking environment for the pet as the water circulation reduces the bacteria development in the container. Furthermore, it provides nutritional aspects by helping to reduce the risk of urinary tract infections, which often occur in pets as a result of insufficient water intake. It has been observed that small animals, especially cats, are attracted to running water; thus, by providing a water bowl having running water, the attraction will cause pets to drink with greater frequency. Thus, the increased water intake will reduce the risk of urinary tract infections. In addition, because pets are attracted to the flow of water, they are less likely to drink from sinks, toilets, tubs, etc.

BRIEF DESCRIPTION OF THE DRAWINGS

FIG. 7 is a perspective view of the portable storage reservoir.

FIG. 8 is a elevation view of the portable storage reservoir.

FIG. 9 is a perspective view of the screw on cap.

FIG. 10 is a section view taken along line 10—10 of FIG. 9.

FIG. 11 is a top plan view of the watering apparatus lid.

DESCRIPTION OF THE PREFERRED EMBODIMENTS

Figure 1:
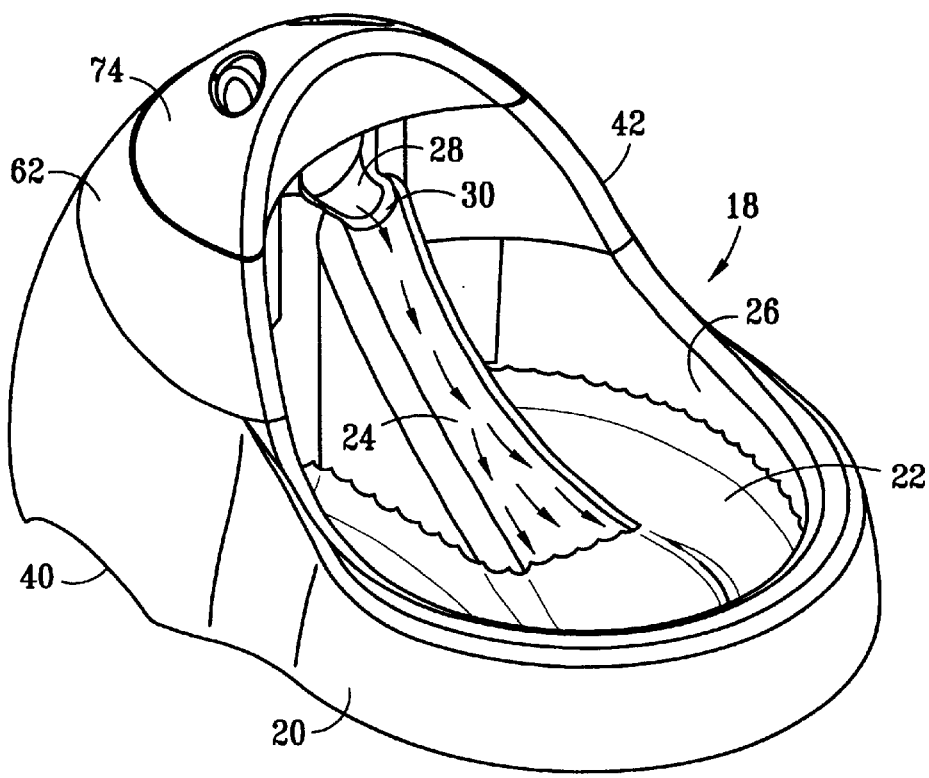
FIG. 1 shows a perspective view of the present invention.
Figure 2:
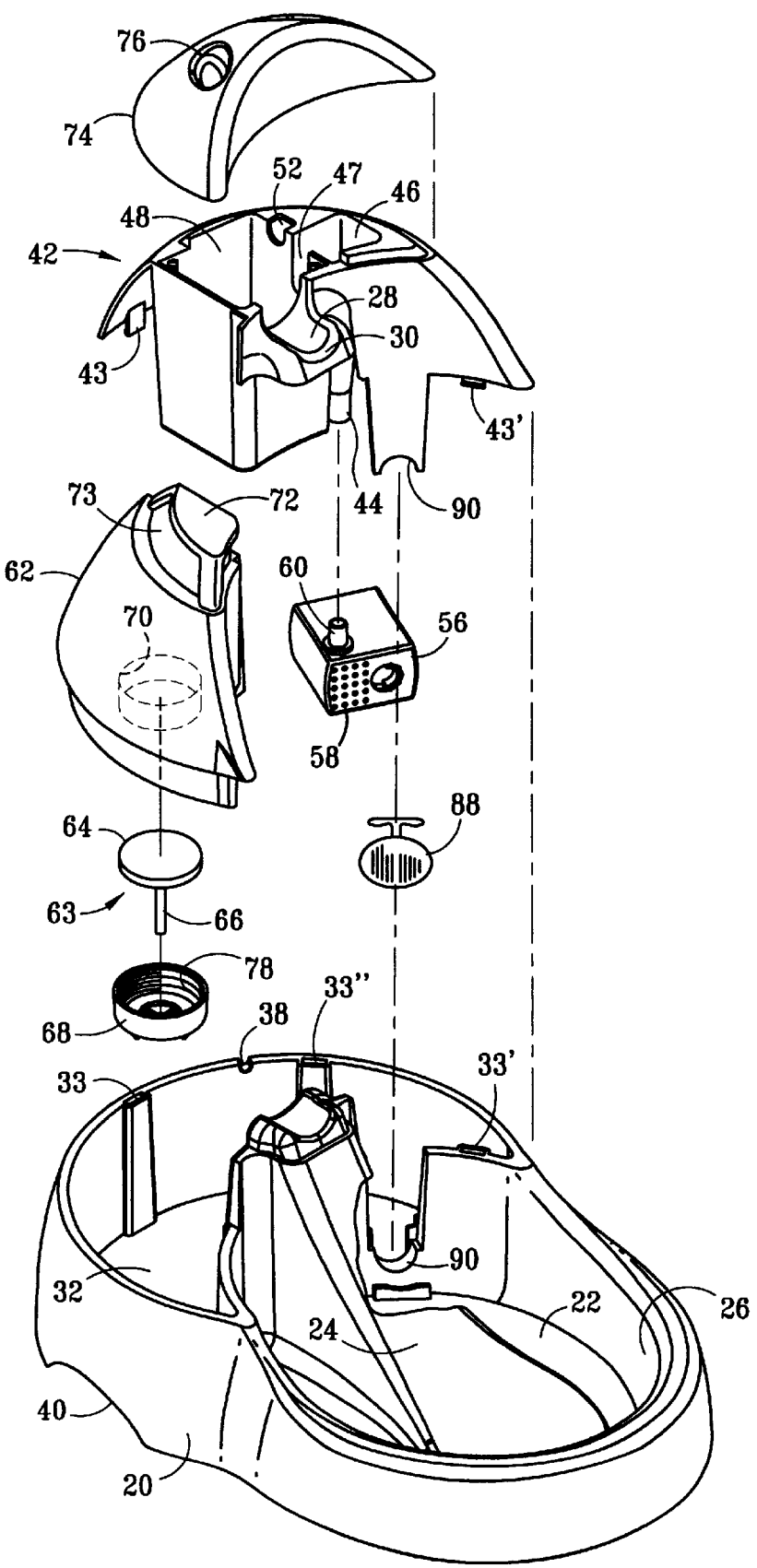
FIG. 2 shows an exploded view of the present invention illustrating the ramp partially cut away.

Referring to FIGS. 1 and 2, continuous waterer apparatus 18 comprises a lower container 20, a submersible pump 56, a water processing apparatus 42 and a removable storage reservoir 62. Taken together, lower container 20, pump 56, processing system 42 and reservoir 62 form an automatic watering device 18 for small pets that continually pumps, filters and circulates water with minimal noise and splashing to attract pets. This device pumps water from lower container 20 to a predetermined height where it is released onto ramp 24 and back into the lower container 20 for re-circulation. The movement of water maintains a fresh supply of water for pets to drink as the turbulence caused by the flowing water reduces the growth of bacteria and fungus.

Figure 3:
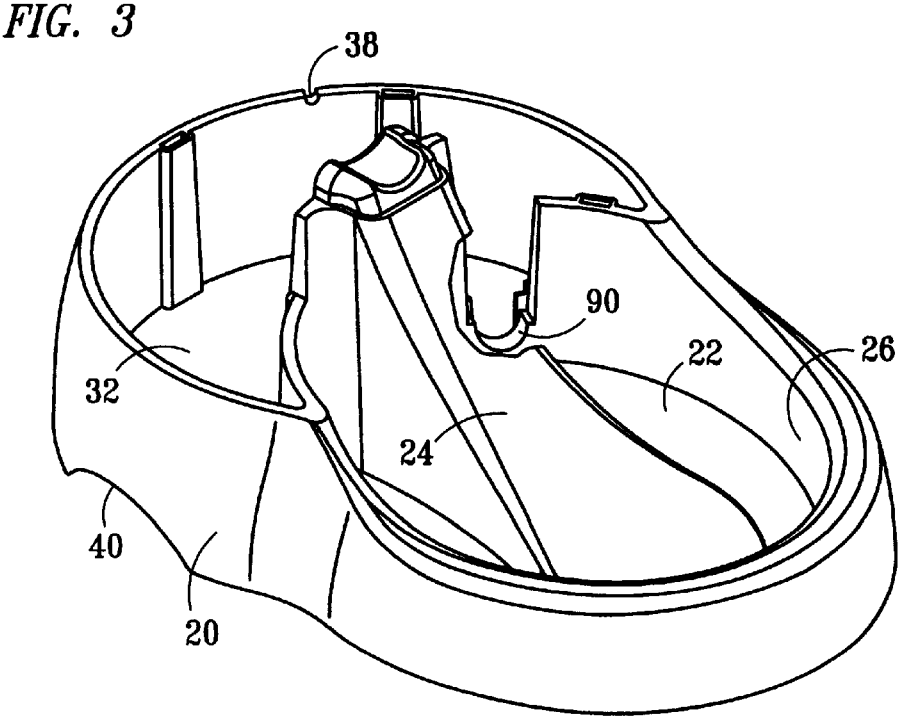
FIG. 3 shows a perspective view of the lower container and curved ramp illustrating the ramp partially cut away.
Figure 4:
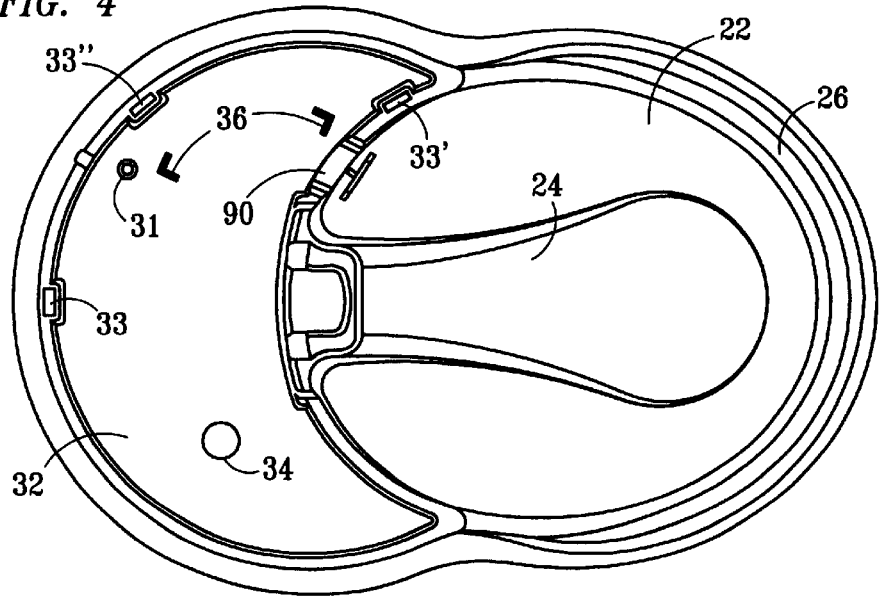
FIG. 4 shows a top plan view of the lower container detailing the curved ramp, the front container, and the rear container.

Referring to FIGS. 3 and 4, lower container 20 comprises a forward container 22, a rear container 32 and a ramp 24. Forward container 22 is generally circular in shape and includes sidewall 26 to hold water. Container 22 resembles a traditional pet water bowl so that it can be easily recognized and used by pets. Curved ramp 24, located inside forward container 22, slopes upward from the front portion of container 22 toward the rear of the container, as best seen in FIG. 3. Ramp 24 is designed to support water as it flows from the uppermost portion of ramp 24 until it slides into container 22. The surface of ramp 24 has a smooth finish to reduce splashing and turbulent flow of water as it slides down the surface. Ledge 28, located on the top portion of ramp 24, forms a semi-circular channel with a predetermined radius to direct water toward ramp 24. Lip 30, located on ledge 28, comprises a rounded edge to promote smooth water flow as the water stream transitions from ledge 28 onto ramp 24. Ledge 28 and lip 30, taken together, direct and concentrate the flow of water onto ramp 24 to establish a smooth, thick and splash free flow on the center of ramp 24. According to one embodiment of the present invention, ramp 24 has a parabolic shape to minimize splashing as the water flows on ramp 24 from lip 30 to forward container 22. Ramp 24 can also be linear, circular, or any other shape that is capable of supporting the water as it flows from lip 30 to forward container 22. The stream of flowing water on ramp 24 works not only to attract pets to the waterer, but also disturbs the surface tension of water in container 22 to inhibit bacteria and fungus growth.

Referring to FIG. 4, rear container 32 is crescent shaped and is attached adjacent forward container 22 to permit water to freely flow between both containers through opening 90. As seen in FIG. 2, a filter or strainer 88 is placed over opening 90 so as to prevent debris such as cat hair, dirt, or any other foreign object from entering rear container 32. When strainer 88 is positioned over opening 90, strainer 88 is supported and locked in position by water processing apparatus 42 and container boundary 26 of lower container 20. Thus, when the user desires to clean strainer 88, water processing apparatus 42 is separated from lower container 20 such that strainer 88 can be removed from opening 90. This configuration also prevents pets from loosening strainer 88 and accidentally swallowing the strainer when mounted over opening 90.

Pump 56, held in position by support brackets 36, is a standard submersible pump having an electric motor with impeller, suction port 58 and a discharge port 60. Pump 56 produces a variable flow rate ranging from approximately 15–40 gallons per hour by positioning flow regulator (not shown) to increase or decrease the flow rate of the pump. Pump 56 can be powered by either household A.C. electricity or batteries. Power is supplied to pump 56 via a power cord (not shown) that is directed through cord opening 38 on the rear container. Container 32 holds a sufficient amount of water in order to cover submersible pump 56 so that suction port 58 is completely submerged. In this configuration the operation of the pump produces minimal noise.

Referring to FIGS. 1–3, a pair of carrying handles 40 is formed on lower container 20, located beneath rear container 32. While only one handle 40 can be seen, a second handle 40 is present on the opposite side in mirror image.

Figure 5:
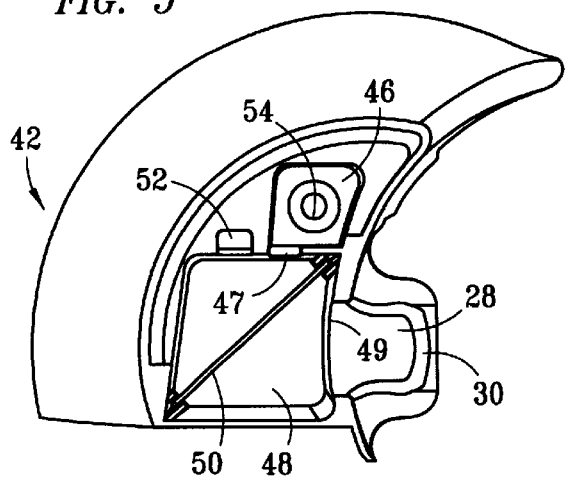
FIG. 5 illustrates a top plan view of the water processing apparatus.
Figure 6:
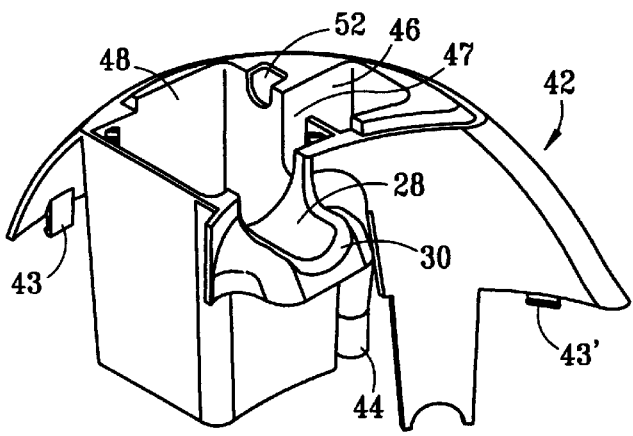
FIG. 6 is a perspective view of the water processing apparatus.

As seen in FIGS. 5 and 6, water treatment apparatus 42 is used to filter and clean the water as it is pumped from lower container 20. Water is pumped from lower container 20 to intake chamber 46 via lift tube 44 (best seen in FIG. 6). The diameter of lift tube opening 54 is properly sized to reduce turbulence and prevent splashing when water enters intake chamber 46. As water enters intake chamber 46, an equal amount of water exits via channel 47 to upper reservoir 48, where the water is filtered. Overflow drain 52, located slightly higher than the operating water level in reservoir 48, is designed to prevent overflow in reservoir 48. Overflow drain 52 directs water from reservoir 48 to rear container 32 for eventual re-circulation back to water processing apparatus 42.

Filter 50 (FIG. 5) removes dust, dirt, hair, or any other debris that collects from operating the watering device. Filter 50 is most preferably a removable carbon based filter with a polyester covering that is mounted diagonally across upper reservoir 48 and extending the entire height of the reservoir. Particulate is filtered from the water as it travels from channel 47 toward ledge 28. After filtration, the water exits over curved ledge 28 and onto ramp 24, where the water slides into forward container 22.

Water processing apparatus 42 is attached above rear container 32 so that lift tube 44 is aligned with pump discharge port 60. Water processing apparatus 42 can be detached from rear container 32 without using tools when the owner desires to clean or store the apparatus. When installing processing apparatus 42, a guide stem (not shown) located on the underside of the water processing apparatus is inserted into guide port 31 for aligning with lower container 20. Further, detent members 43, 43' and 43" (not shown) are aligned with alignment ports 33, 33' and 33" (FIG. 4) and are gently pushed together so that processing apparatus 42 rests securely on the lower container. In order to detach water processing apparatus 42, a slight force is applied in the opposite direction to release the apparatus from rear container 32.

Storage reservoir 62, as seen in FIGS. 7 and 8, provides a constant supply of water to lower container 20 in order to reduce the frequency in which the owner must add water to the apparatus. In addition, storage reservoir 62 helps to maintain a minimum water level in container 20 so that suction port 56 remains submerged at all times. This helps to maintain virtually silent operation.

Reservoir 62 comprises an opening 70 for filling the reservoir with water. When storage reservoir 62 is filled, valve assembly 63 is inserted over opening 70 to regulate water flow from the reservoir. As best seen in FIG. 2, valve assembly 63 comprises a cover 64, a stem 66 and a cap 68, all operable together to regulate the flow of water into lower container 20. Referring to FIGS. 9 and 10, cap 68 comprises a threaded interior 78 to easily attach the valve assembly to threads 82 on reservoir 62. Stem 66, which is attached to the bottom side of cover 64, is inserted into opening 80 (FIG. 10). The diameter of opening 80 is slightly larger than the stem diameter to permit the stem to slide relative to opening 80. When valve assembly 63 is installed and reservoir 62 is holding water, the weight of the water seats cover 64 on annular ridge 84 and provides a sufficient seal to prevent water flow through opening 86. Thus, when carrying storage reservoir 62 from the re-fill area to the watering device, no spilling occurs.

Once reservoir 62 is filled, it is placed above rear container 32 and adjacent water processing apparatus 42. Cover 64 and stem 66, which extends downward from reservoir 62, are pushed upward by bump 34 (FIG. 4) to allow water to flow through opening 86. When the water level in lower container 20 falls below a minimum level from use or by evaporation, water will be gravity fed into container 20 to replenish the water supply. This configuration provides substantially silent operation as pump 56 is submerged at all times during operation, regardless of whether or not water is delivered to the lower container in a non-splashing manner. After reservoir 62 empties, the owner can remove the reservoir from waterer 18 using grips 73, to detach valve assembly 63 and re-fill the device for continued use. Reservoir 62 comprises a flat storage surface 72 to allow owners to place it on flat surfaces when filling or storing the device.

Alternatively, a control switch (not shown) can be optionally installed to automatically shut off pump 56 if the water level falls below a pre-determined height.

Referring to FIG. 11, lid 74 can be seen. Lid 74 is positioned above remote storage reservoir 62 and water processing system 42 to prevent pets from drinking from the upper reservoir and to add to the overall aesthetic appearance of watering apparatus 18.

During operation and use of the present invention, pump 56 is positioned inside rear container 32 and container 20 is filled with an amount of water to submerge pump suction port 58. An electrical power cord (not shown) is positioned to rest in slot 38 to provide power to pump 56. Water processing apparatus 42 is then placed over rear container 32 and connected to pump 56. Reservoir 62 is filled at a remote water source and closed by placing valve assembly 63 over opening 70 to prevent water from leaking as it is carried from the remote water source and placed in position over rear container 32. As reservoir 62 is installed, bump 34 pushes upward on stem 66 to gravity feed the water into container 20 if the water level in lower container 20 falls below a level insufficient to cover pump suction port 58. The power cord (not shown) is plugged into a conventional electrical outlet (not shown) to supply electrical power to submersible pump 56.

In operation, pump 56 transfers water from lower container 32 to intake chamber 46 via intake tube 44. Water next passes into upper reservoir 48 where debris is separated from the water to provide fresh re-circulated water. After filtration, water travels toward upper reservoir exit 49 and onto curved ledge 28 where the water is concentrated into a narrow stream and directed over ledge 30 to provide a thick and smooth flowing stream as it travels on ramp 24. The flowing water provides sufficient circulation to maintain a fresh supply of water to prevent water from stagnating to maintain a fresh supply of water for extended periods. Water is then re-circulated through the system via pump 56 and the process is repeated until pump 56 has been de-activated.

Figure 12:
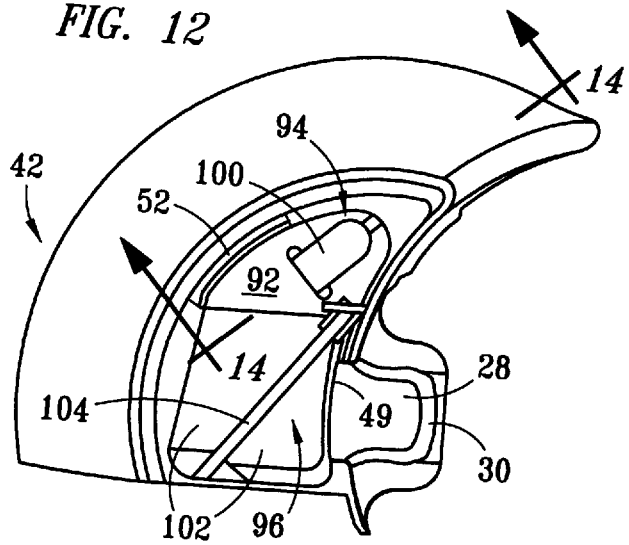
FIG. 12 is a top plan view of the present water processing apparatus.
Figure 13:
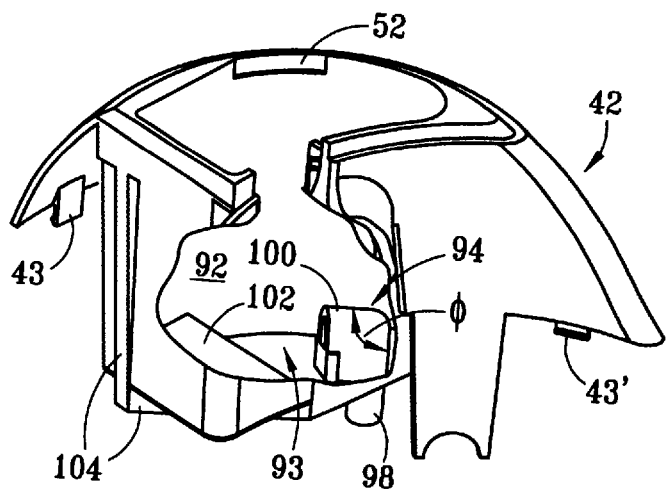
FIG. 13 is a perspective view of the water processing apparatus shown in FIG. 12.
Figure 14:
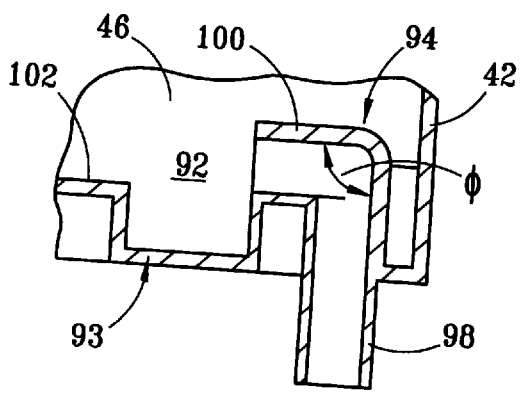
FIG. 14 is a section view taken along line 14—14 of FIG. 12.

Referring to FIGS. 12–14, the present water processing apparatus 42 can be seen. In this configuration, processing apparatus 42 contains an upper reservoir 92 having a floor 93. Upper reservoir 92 includes a diverter 94, a filter support 96 on floor 93 for supporting filter 50 (FIG. 5) and an overflow drain 52. Referring specifically to FIGS. 13 and 14, diverter 94 contains a lower portion 98 and an upper portion 100. Lower portion 98 connects to pump discharge port 60 (FIG. 2) and transports water from pump 56 toward upper portion 100. Upper portion 100 is angularly positioned at an angle Φ with respect to lower portion 98 to direct water inside upper reservoir 92 and in the general direction of filter 50. The angular displacement Φ permits water to more easily flow through filter 50 while also directing water into upper reservoir 92 well below the water operating level (slightly below overflow drain 52). By having water enter near floor 93 of the upper reservoir and below the water operating level, the water contained inside upper reservoir 92 acts as an insulator thereby reducing noise and turbulence associated with water flowing inside the upper reservoir. As seen in FIG. 14, upper portion 100 is preferably angularly positioned ninety degrees from lower portion 98. It should be realized by one of ordinary skill that any angle Φ will be sufficient so long as water is directed inside upper reservoir 92.

To prevent improper installation of filter 50, filter support 96 contains an elevated floor portion 102 and a slot 104 extending across the elevated floor and upward along the sidewalls of upper reservoir 92. Slot 104 is configured to receive and hold filter 50 (FIG. 5) across reservoir 92 so as to ensure all water is filtered before leaving reservoir exit 49. If filter 50 is not placed inside slot 104 and rests on any part of elevated floor 102, the filter will extend above the upper reservoir top boundary. While in this position, lid 74 will be prevented from properly resting above reservoir 92. This will alert the user that filter 50 must be re-configured and placed inside slot 104.

The present invention can be used with or without filter 50 and storage reservoir 62, if desired. In an alternate embodiment not here shown, waterer apparatus 18 can be constructed and operated without using processing apparatus 42. In operation, water is pumped and transported from a container for holding water where pets can drink therefrom. Using pump 56 and lift tube 44, water is directed from lift tube 44 onto ramp 24 by ledge 28, which connects lift tube 44 with ramp 24.

The components of waterer device 18 are constructed using a lightweight water resistant plastic material and are most preferably formed by injection molding. Container 62 is preferably blow molded and fabricated from a translucent or clear plastic material to allow the water level to be observed while mounted on the waterer.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

We claim:

1. A continuous watering device for small pets producing minimal noise and splashing, comprising:
   a lower container for holding water wherein at least a portion of said lower container has an open top to allow pets to drink from said lower container;
   a water processing apparatus wherein said water processing apparatus contains an upper reservoir for holding water located above said lower container;
   a pump having a suction port and a discharge port wherein said suction port removes water from said container and said discharge port directs water to said upper reservoir;
   a diverter disposed in said upper reservoir for directing water to said upper reservoir, said diverter having a lower portion and an upper portion wherein said lower portion is attached to said pump discharge port and said upper portion is angularly displaced from said lower portion to direct water into said upper reservoir;
   a smooth and curved ramp having a top and a bottom and spaced apart sides and having a flat center portion disposed between said sides to support a stream of flowing water as the water moves from said upper reservoir at said top of said ramp to said lower container at said bottom of said ramp; and
   a ledge attached to said upper reservoir having a curved lip and a curved cross sectional area wherein said curved lip creates a thick and smooth water flow upon exiting the upper reservoir to reduce noise and splashing and said curved cross sectional area directs the stream of flowing water onto said flat center portion of said curved ramp so as to contain the water flow on the ramp at all times to prevent splashing and noise as the water flows downward on said ramp.

2. The continuous watering device of claim 1 wherein said diverter upper portion is angularly displaced about 90 degrees from said lower portion.

3. The continuous watering device of claim 1 wherein said pump is a submersible pump whereby all suction ports are submerged.

4. The continuous watering device of claim 1 wherein the upper reservoir includes a filter.

5. The continuous watering of claim 4 wherein said filter is a charcoal based filter surrounded by a polyester covering.

6. The continuous watering device of claim 1 wherein said upper reservoir includes an overflow drain to direct excess water from said upper reservoir to said lower container.

7. The continuous watering device of claim 1 and further including a strainer in said lower container to prevent debris from entering said pump suction port wherein said strainer is mounted and locked in position between said water processing apparatus and said lower container.

8. The continuous watering device of claim 1 and further including a removable and portable storage reservoir including a valve having an open position and a closed position wherein said valve is in the closed position when not installed on the continuous watering device and said valve is in the open position when installed on the continuous watering device.

9. The continuous watering device of claim 8, wherein said removable and portable storage reservoir is translucent.

10. The continuous watering device of claim 1 wherein said lower container includes a forward container and a rear container, said forward container having an open top to allow pets to drink from said forward container and said rear container being enclosed for maintaining said pump spaced apart from said forward container.

11. The continuous watering device of claim 10 and further including a strainer for preventing debris from entering said rear container.

12. The continuous watering device of claim 4 wherein said upper reservoir contains an elevated floor portion wherein said elevated floor portion contains a filter support slot to support said filter while mounted inside said upper reservoir.

* * * * *